(12) United States Patent
Balasubramanian (10) Patent No.: US 12,375,903 B2
(45) Date of Patent: Jul. 29, 2025

(54) NEUTRAL HOST ENHANCED FEATURES

(71) Applicant: Celona, Inc., Cupertino, CA (US)

(72) Inventor: Srinivasan Balasubramanian, San Diego, CA (US)

(73) Assignee: CELONA, INC., Campbell, CA (US)

( * ) Notice: Subject to any disclaimer, the term of this patent is extended or adjusted under 35 U.S.C. 154(b) by 408 days.

(21) Appl. No.: 17/960,025

(22) Filed: Oct. 4, 2022

(65) Prior Publication Data

US 2023/0106524 A1    Apr. 6, 2023

Related U.S. Application Data

(60) Provisional application No. 63/251,915, filed on Oct. 4, 2021.

(51) Int. Cl.
*H04W 8/26* (2009.01)
*H04W 4/021* (2018.01)
*H04W 16/14* (2009.01)
*H04W 48/18* (2009.01)

(52) U.S. Cl.
CPC ............ *H04W 8/26* (2013.01); *H04W 4/021* (2013.01); *H04W 16/14* (2013.01); *H04W 48/18* (2013.01)

(58) Field of Classification Search
CPC ....... H04W 8/26; H04W 4/021; H04W 16/14; H04W 48/18
USPC ........................................................ 370/329
See application file for complete search history.

(56) References Cited

U.S. PATENT DOCUMENTS

| | | | |
|---|---|---|---|
| 2007/0206571 A1* | 9/2007 | Silver | H04L 65/104 370/352 |
| 2010/0289640 A1* | 11/2010 | Annamalai | H04W 4/90 340/539.13 |
| 2016/0087972 A1* | 3/2016 | Ahmavaara | H04W 12/043 726/10 |
| 2016/0134621 A1* | 5/2016 | Palanigounder | H04W 12/35 713/156 |
| 2017/0164234 A1* | 6/2017 | Kalapatapu | H04W 28/0231 |
| 2018/0262978 A1* | 9/2018 | Kahn | H04W 48/10 |
| 2018/0278698 A1* | 9/2018 | Joseph | H04L 67/51 |
| 2019/0115950 A1* | 4/2019 | Kakinada | H04W 76/15 |
| 2019/0223023 A1* | 7/2019 | Altay | H04L 41/5051 |
| 2019/0253836 A1* | 8/2019 | Sinha | H04W 8/04 |
| 2019/0364615 A1* | 11/2019 | Das | H04W 24/08 |
| 2020/0008007 A1* | 1/2020 | Belghoul | H04W 4/50 |
| 2020/0053619 A1* | 2/2020 | Sartori | H04W 8/08 |
| 2020/0280890 A1* | 9/2020 | Vikberg | H04W 36/0016 |
| 2021/0105670 A1* | 4/2021 | Chiang | H04W 8/26 |
| 2021/0243607 A1* | 8/2021 | Schmidt | H04W 72/0453 |
| 2021/0320873 A1* | 10/2021 | LaPierre | H04L 47/2433 |
| 2022/0295266 A1* | 9/2022 | Chang | H04W 8/26 |
| 2022/0360580 A1* | 11/2022 | Mishra | H04W 12/009 |
| 2023/0142951 A1* | 5/2023 | Maria | H04W 12/086 455/411 |
| 2024/0064133 A1* | 2/2024 | Ahmed | H04W 4/60 |

(Continued)

*Primary Examiner* — Mark G. Pannell
(74) *Attorney, Agent, or Firm* — Jaquez Land Greenhaus & McFarland, LLP; Bruce W. Greenhaus (57) ABSTRACT

Methods and apparatus for Neutral Host Enhanced Features are disclosed. One of the features that are addressed by the presently disclosed methods and apparatus is used when receiving eMBMS broadcasts. Another enhanced feature provided to the Neutral Host and enabled by the presently disclosed methods and apparatus regards the Preferential Treatment of Enterprise Network Employees.

10 Claims, 7 Drawing Sheets

(56) References Cited

U.S. PATENT DOCUMENTS

2024/0089846 A1* 3/2024 Munoz-Sanchez ... H04W 48/18
2024/0244429 A1* 7/2024 Nie ...................... H04W 12/69

* cited by examiner

NEUTRAL HOST ENHANCED FEATURES

CLAIM OF PRIORITY TO PREVIOUSLY FILED PROVISIONAL APPLICATION—INCORPORATION BY REFERENCE

This non-provisional application claims priority to an earlier-filed provisional application No. 63/251,915 filed Oct. 4, 2021, entitled "Neutral Host Enhanced Features" and the provisional application No. 63/251,915 filed Oct. 4, 2021, and all its contents, are hereby incorporated by reference herein as if set forth in full.

BACKGROUND

Figure 1:
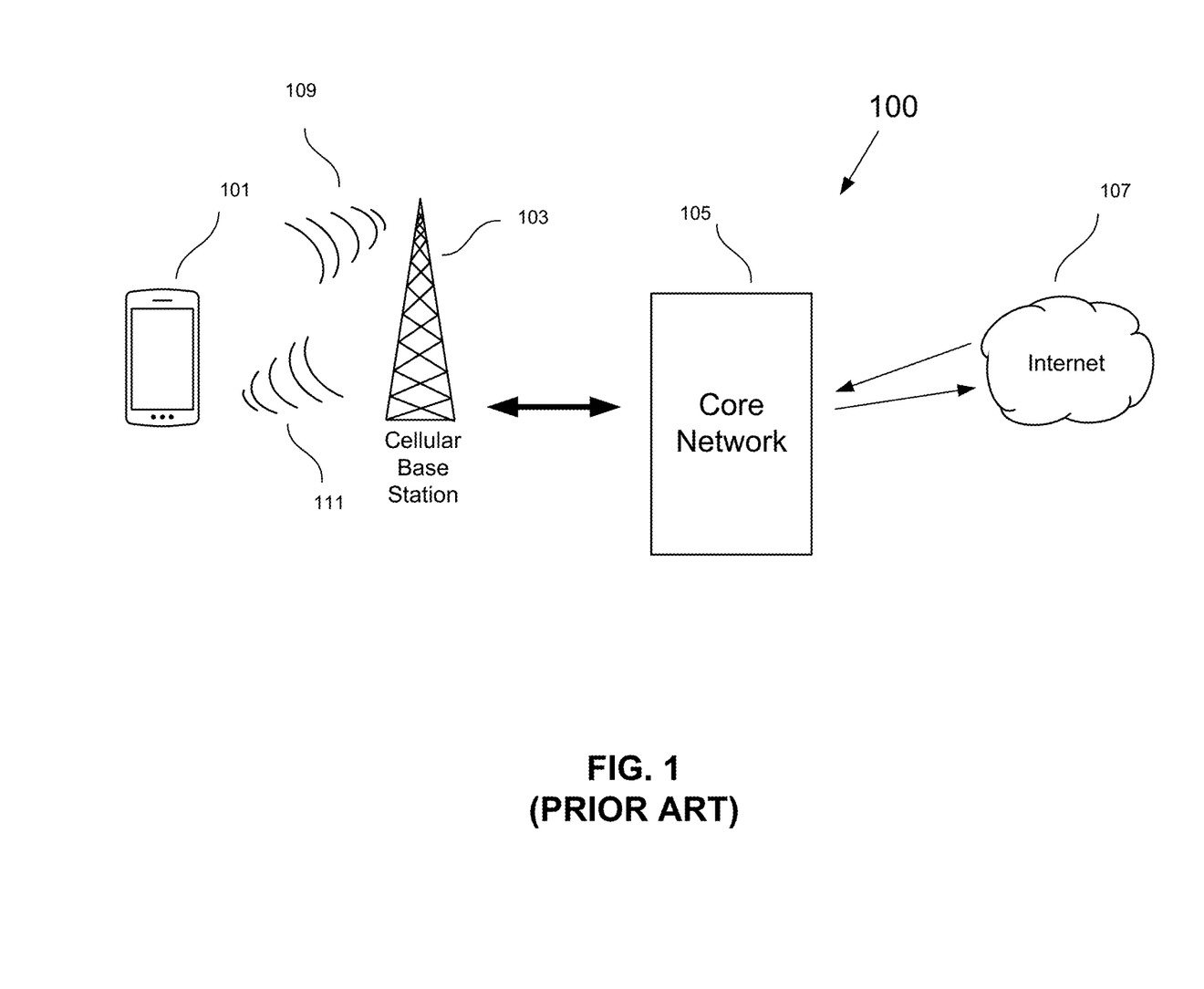
FIG. 1 shows a basic configuration for a communication network, such as a "4G LTE" (fourth generation Long-Term Evolution) or "5G NW" (fifth generation New Radio) network, in which user equipment (UE) communicates with a base station/access point (BS/AP).

FIG. 1 shows a basic configuration for a communication network 100, such as a "4G LTE" (fourth generation Long-Term Evolution) or "5G NW" (fifth generation New Radio) network, in which user equipment (UE) 101 communicates with a base station/access point (BS/AP) 103. The term UE refers to a wide array of devices having wireless connectivity, such as a cellular mobile phone, Internet of Things (IoT) device, virtual reality googles, robotic device, autonomous driving machine, smart barcode scanner, and communications equipment. Communications equipment includes desktop computers, laptop computers, tablets and other types of personal communications devices.

Throughout this disclosure, the term BS/AP is used broadly to include at least an eNB (Evolved Node B or E-UTRAN Node B) of a 4G network or gNB (5G node B) of an LTE/5G network, a cellular base station (BS), a Citizens Broadband Radio Service Device (CBSD), a WiFi access node, a Local Area Network (LAN) access point, a Wide Area Network (WAN) access point, etc. and should also be understood to include other network receiving hubs that provide wireless access to a network via a plurality of wireless transceivers.

In some cases, a UE 101 uses a BS/AP 103 to gain access to a plurality of networks that in turn provide access of other devices and services. These networks may consist of public and enterprise networks. The industry standards that define 5G technology support both public networks and enterprise networks. Public networks include networks that are open to any subscriber, such as cellular networks. Enterprise networks are typically networks for which access is restricted to members of a particular organization or "enterprise", thus the name. Network administrators typically determine whether a particular UE has access to the network. In many such cases, access is controlled by allowing only UEs to whom proper credentials have been provided by the network administrator. Often, the credentials comprise a digital code that is encrypted on a Subscriber Identification Module (SIM) card. The BS/AP 103 is coupled to a core network (hereafter "core") 105 that manages traffic through the BS/AP 103 and connectivity (i.e., access) to resources, such as the internet 107.

Figure 2:
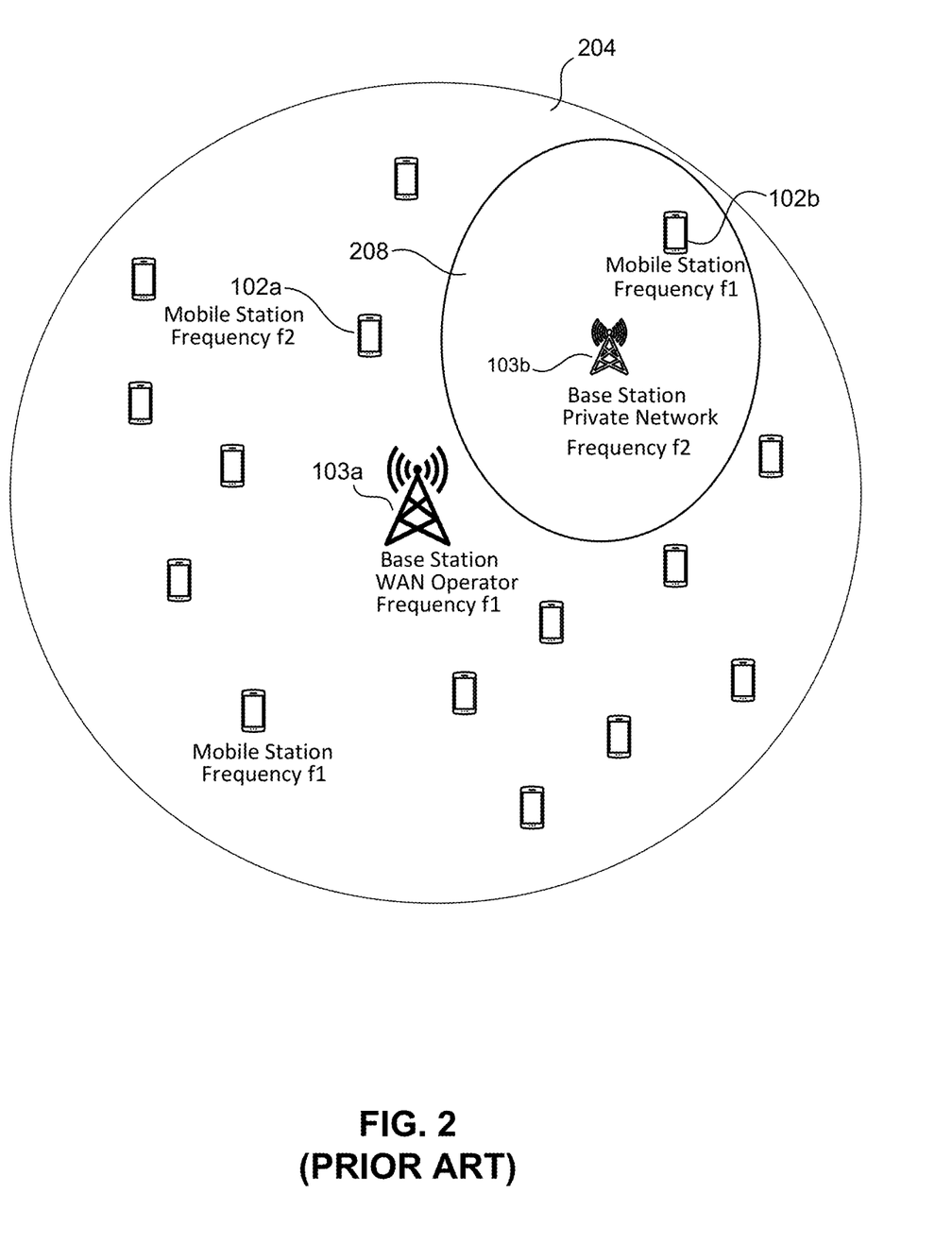
FIG. 2 is an illustration of a larger network, such as a 5G cellular network operated by an MNO, sometimes referred to as a wireless service provider.

FIG. 2 is an illustration of a larger network 204, such as a 5G cellular network operated by an MNO, sometimes referred to as a wireless service provider. Within the geographic operating area of the MNO network 204, an enterprise network 208 may be established by a private network operator, such as an enterprise network operator (ENO). BS/APs 103a of the MNO network 204 may service a plurality of UEs 101. Each may be present within a coverage area of the MNO network 204 that operates on a first frequency f1. In some cases, the enterprise network 208 is located within the geographic footprint of the MNO network 204. In such cases, one or more enterprise network BS/APs 103 may provide connectivity over a second frequency, f2 to allow UEs 101 within the geographic footprint to access the enterprise network 208.

In addition to MNOs and ENOs, Mobile Virtual Network Operators (MVNOs) provide a "virtual" network that uses both the BS/APs and the network infrastructure operated by MNOs to provide access for an MVNO subscriber UE (hereafter, simply referred to as a "MVNO UE") to services. Still further, there are services that use an MNO BS/AP, but that route packets through that MNO BS/AP to their own network Evolved Packet Core (EPC). For the purposes of this disclosure, these networks are referred to as enterprise networks. Throughout this disclosure, communications are discussed in which "packets" are "routed", "transmitted" and "received". However, packets are merely one example of communications and embodiments are not limited to packets, as communications may take other forms as well.

Figure 3:
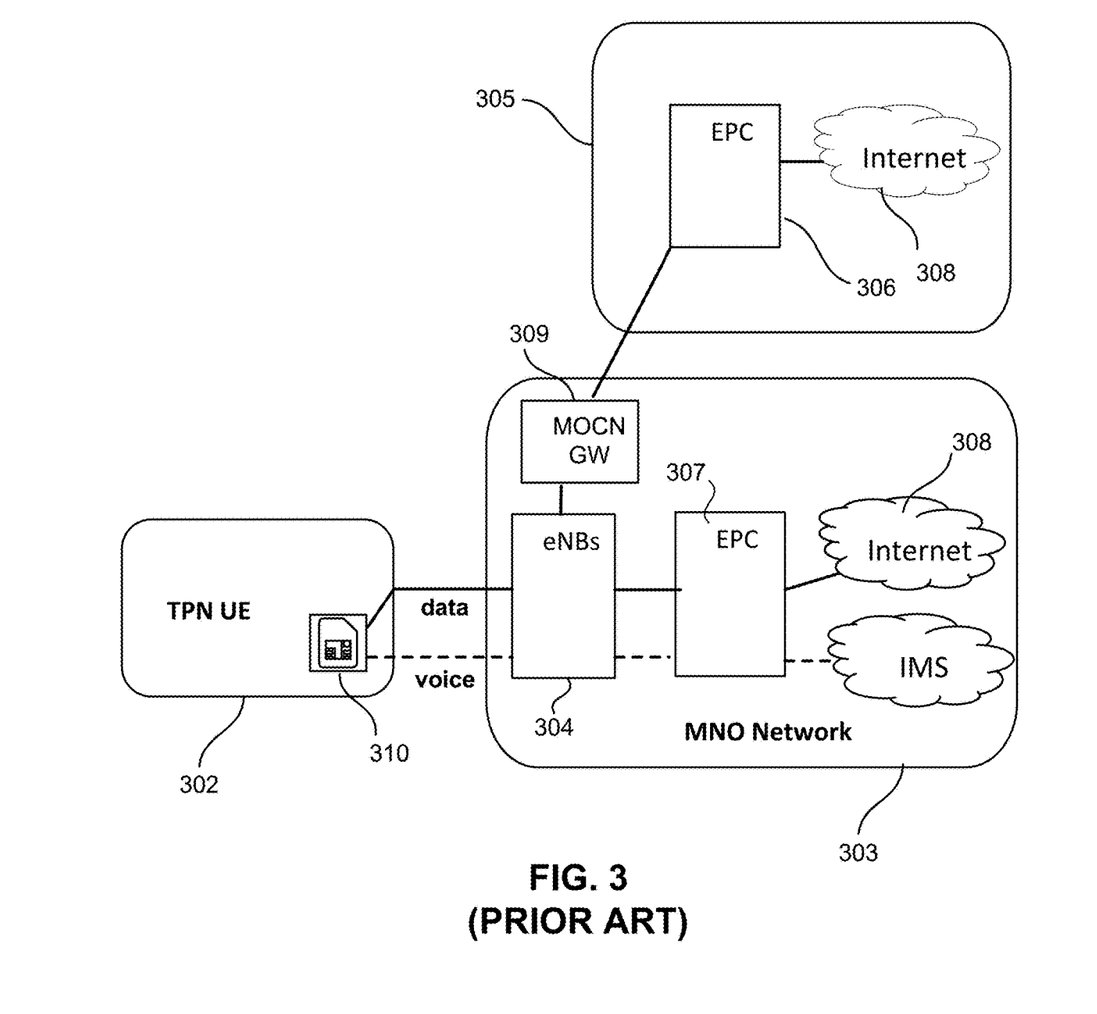
FIG. 3 shows a configuration in which a UE within the coverage area of an MNO network can communicate with the MNO network and an enterprise network through an MNO BS/AP (i.e., eNB).

FIG. 3 shows a configuration in which a UE 302 within the coverage area of an MNO network can communicate with the MNO network and an enterprise network through an MNO BS/AP (i.e., eNB). Some enterprise networks 305 provide a communication service that allows their subscribers to establish a communication link to the enterprise network's infrastructure (e.g., an enterprise core network 306, such as an enterprise EPC) through the physical radio infrastructure of another network (e.g., the MNO 303). An architecture in which more than one core network (hereafter "core") 306, 307 can be accessed through the same BS/AP is commonly referred to as a Multi-Operator Core (MOCN). In some embodiments, the BS/AP is an eNB (Evolved Node B or alternatively E-UTRAN Node B) 304. In such cases, a gateway, such as a MOCN gateway 309, resides between the eNB 304 and one or more cores, each of which can be accessed by a UE 302 through the eNB 304. The MOCN gateway directs packets that flow from the UE 302 through the eNB 304 to the appropriate core 306. While only one such core 306 is shown, it should be understood that there may be other such cores as well. An enterprise network subscriber UE (hereafter, simply referred to as a "TP UE") 302 within the coverage area of an MNO network 303 may be connected to the MNO eNB 304. The MNO eNB 304 is part of the MNO network 303; but is connected to the enterprise network 305 through the MOCN gateway 309. Accordingly, the MNO eNB 304 can be used to connect the UE 302 to the enterprise network's EPC 306.

Figure 4:
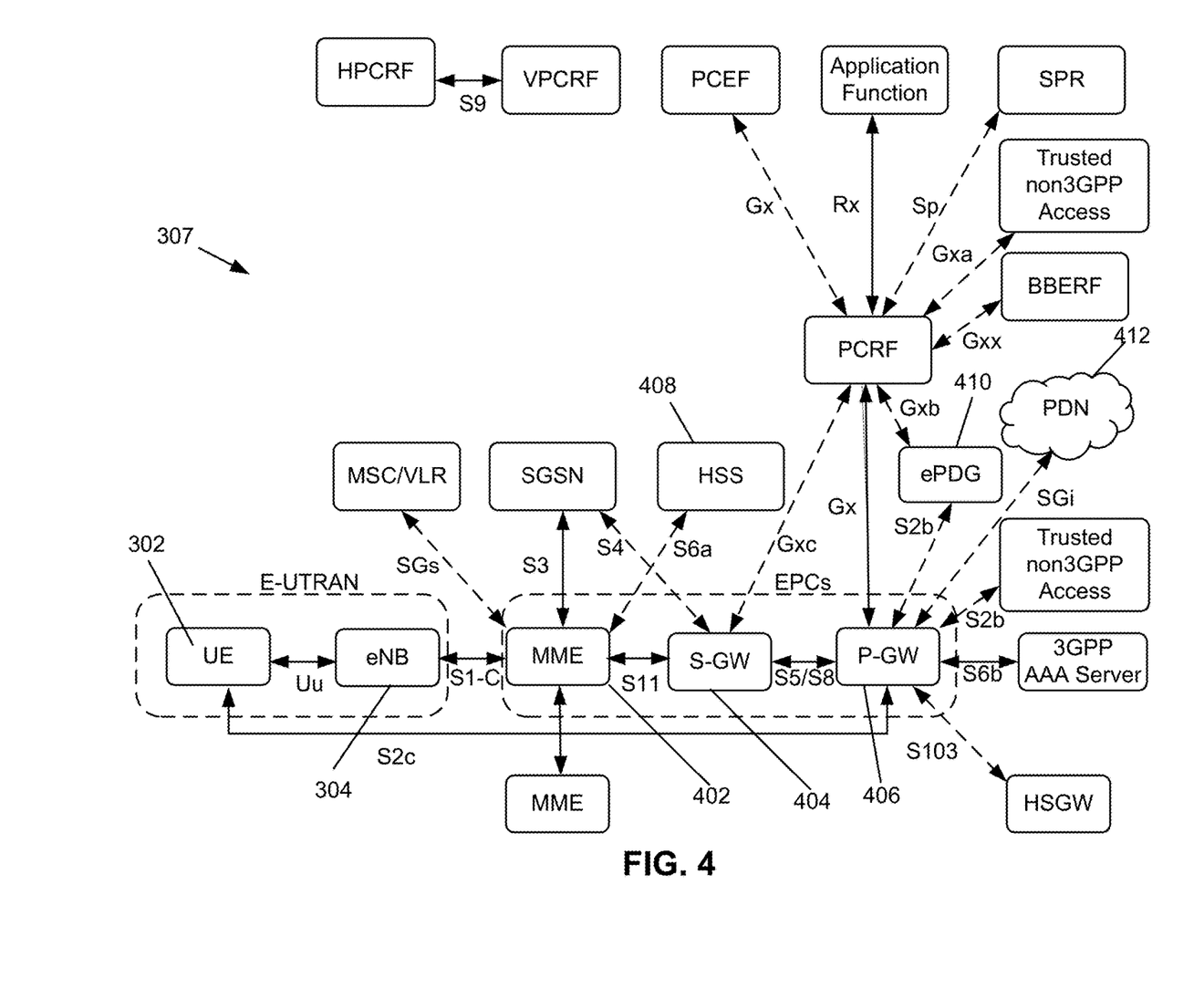
FIG. 4 is a simplified block diagram of the components of an EPC, such as the MNO EPC shown in FIG. 3.

FIG. 4 is a simplified block diagram of the components of an EPC, such as the MNO EPC 307 shown in FIG. 3. The EPC 307 comprises an MME (Mobility Management Entity) 402, SGW (Serving Gateway) 404, at least one PGW (Packet Gateway) 406, HSS (Home Subscriber Server) 408, ePDG (evolved Packet Data Gateway) 410, etc. The SGW routes UE 302 data packets to a Packet Data Network (PDN) 412. Accordingly, the MNO EPC 307 can establish a connection to an outside PDN 412 and thus provides connectivity to the internet 308 or to other external services. That is, while the enterprise network 305 uses the MNO's eNB 304, the enterprise network 305 provides its own EPC 306 to allow the enterprise network 305 to control data flows through the MNO's eNB 304.

Broadcast and multicast services in 5G allow consumption of multimedia services to large numbers of users concurrently. This permits an offload of traffic during times when several users are consuming the same content in parallel. However, a UE that is operating on an enterprise network without explicit support on an associated neutral host will not be able to receive the broadcast content. Furthermore, it may be desirable for only member UEs of a secure enterprise network to be able to take advantage of a neutral host offloading to the enterprise network to which the UE is a member.

Therefore, a need exist for methods and apparatus of Neutral Host Enhanced Features that permits a UE to receive broadcast and multicast services via an Enterprise Network acting as a neutral host.

Furthermore, it is desirable that such methods and apparatus allow for only member UEs of a secure enterprise network to be able to take advantage of a neutral host offloading to the enterprise network to which the UE is a member. Such methods and apparatus should block access to the network services to non-enterprise network employees. Blocking access to NH network to non-enterprise-employees. Preferential resource allocation should be given to enterprise network employees. Furthermore, a need exists for a method and apparatus that receives evolved Multimedia Broadcast Multicast Services (eMBMS) control information to broadcast service availability notification in the enterprise network. Such methods and apparatus should support evolved Multimedia Broadcast Multicast Services (eMBMS) traffic on the enterprise network. Finally, the methods and apparatus should support unicast eMBMS traffic via the enterprise network while simultaneously allowing access to Enterprise Network services. The present methods and apparatus for Neutral Host Enhanced Features provides solutions for these needs.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

In accordance with some embodiments of the disclosed method and apparatus presented herein, a UE that is a member of an enterprise network is provisioned with geofencing information. When the UE enters a selected geographic area, as determined by the geofencing information, the UE looks for the enterprise neutral host. This can be used with any neutral host architecture.

In some embodiments, RAT (Radio Access Technology)/Frequency Selection Priority (RFSP) is provided on a UE basis. This is done from a Mobile Network Operator (MNO) in a selective way. If the enterprise can negotiate with the MNO for appropriate RFSP provisioning for a member UE, then the MNO can enable only the member UEs to look for their associated enterprise campus information. This can be used with any neutral host architecture.

In some embodiments, an MNO rejects camping based on authorization procedures. The UE will then block the enterprise network Tracking Area Code (TAC) for finite period of time (e.g., 30 to 60 minutes). This approach will apply when a multiple operator core network (MOCN) architecture is used.

In some embodiments in which an S6a/S8 interface approach is implemented, the International Mobile Subscriber Identifiers (IMSIs) of the members of the enterprise network can be stored and the Mobility Management Entity (MME) within the enterprise network can reject or redirect UEs that are not members (in a 4G implementation). A similar method can be implemented in a 5G network as well.

In some embodiments, preferential resource allocation can be provided to UEs subscribing to an enterprise network. In some such cases, a list of UE IMSIs associated with the enterprise are stored. When there is congestion in the network, the UEs that subscribe to the enterprise network are provided preferential access. In some embodiments, the enterprise subscribed UEs are defined as belonging to a user group that is allowed priority over the other users of the network. When resources are limited, preemption of UEs that do not subscribe to the enterprise network provides access to UEs that do subscribe to the enterprise network.

Figure 5:
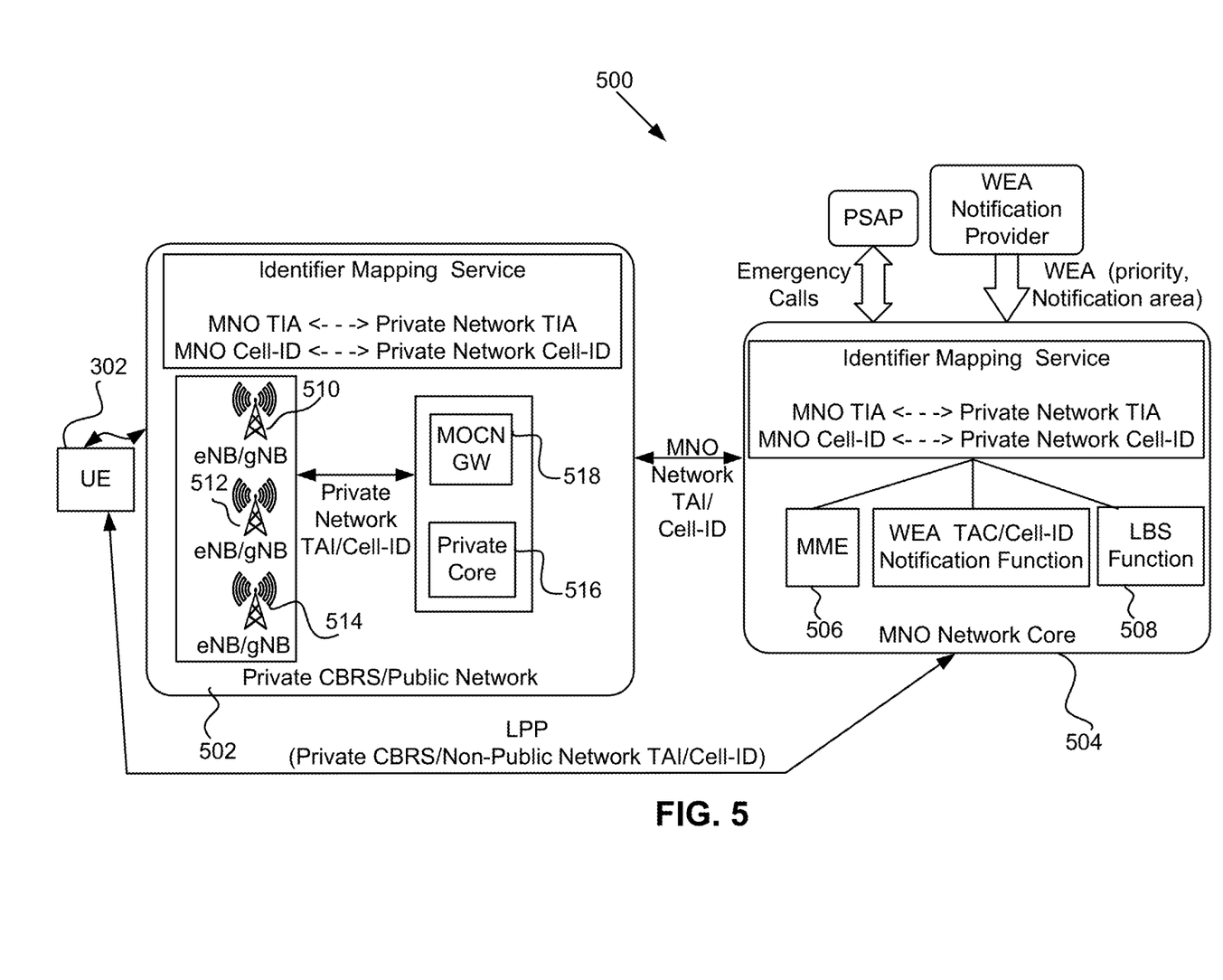
FIG. 5 is a simplified block diagram of components of a Private CBRS/Non-Public network and MNO identifier translation.

FIG. 5 is a simplified block diagram of components of a Private CBRS/Non-Public network and MNO identifier translation. A Private CBRS/Non-public Network (EN network) 502 is shown in communication with an MNO Network Core 504. The EN network 502 may comprise a "neutral host" wherein a neutral host allows access by the UE 302 to an MNO network core 504 via one of the eNB/gNBs (510, 512, and/or 514). Each neutral host eNB/gNB broadcasts the Public Land Mobile Networks ("PLMNs"), PLMN, TAC (Tracking Area Code) and Cell IDs of the EN. The neutral host is privately owned, however UEs may access MNOs via the private network 502 neutral host via the private host eNB/gNBs which are accessible to the MNOs, and in turn, via the MOCN gateways 518. The eNB/gNBs (510, 512, and/or 514) broadcasts the PLMNs to the MNOs so that it can access the UEs 302 via the private CBRS 502. The private network 502 includes "neutral host" behaviors such that it has both a private network and ability to provide coverage for the UEs 302 that have a Private (EN) (or SIM), and it has MNO identified Public Land Mobile Networks ("PLMNs"), or both private and public identifiers. The TAI and Cell-ID mapping across the Private CBRS/

Non-Public network and the individual MNO network assigned identifiers are shared between the two entities.

The Private CBRS/Non-Public network 502 cell broadcasts are based on the Private CBRS/Non-Public network TAI and Cell identifiers. The MNO PLMNs are also broadcast on the neutral host cells. The signaling messages exchanged between the UEs and the Private CBRS/Non-Public network 502 are based on the TAI and Cell identifiers of the Private CBRS/Non-Public network. These signaling messages are transitioned to MNO-specific TAI and Cell identifiers.

There are three functions in the MNO Network Core 504 that are impacted by identifiers broadcast by the private network 502. The first factor occurs when the UE 302 initially attaches to the network with a SIM credential of the MNO. If so, the UE 302 needs to be authenticated by the MME 506 within the MNO Network Core 504. The MME 506 records and identifies the cell ID and the specific location of the UE 302 in this case. The second function impacted by identifiers broadcast by the private network 502 occurs when the identifier broadcasts emergency alerts (such as a fire, active shooter, flood warning, etc., within a particular cell location and geographical location.). The third function impacted by identifiers broadcast by the private network 502 is the location function implemented within the MNO network core 504. The location function is implemented by the Location Based Services Functional block 508 within the MNO Network Core 504. The LBS 508 performs trilateration to determine the location of the UE 302.

Consider the private network eNB/gNBs 510, 512 and 514 of FIG. 5. Each eNB/gNB identifies a cell ID and has a radio cell coverage area. The LBS Function 508 in the MNO network core 504 uniquely determines the Cell ID and location of each of the eNB/gNBs 510, 512 and 514. The Cell ID and location of each of the eNBs/gNBs 510, 512, and 514, are assigned unique numbers that are identifiable to the Private Core 516 (within the private network 502). Each unique number must also be available to the MNO Network Core 504, and visible to MNOs such as Dish, Verizon, AT&T, etc. The number uniquely identifies the Cell ID and location of the selected eNB/gNB to these MNO entities. It comprises a 16-bit number. However, it is quite possible that this 16 bit number can be reused. This presents a problem. This problem is exacerbated when the same 16-bit number is reused by the same MNO such as Verizon, for example. Thus, this presents a problem that needs to be solved to allow the eNB/gNB location and Cell ID to be uniquely identified, even when its unique 16-bit number is reused, especially when it is reused by the same MNO.

These are enhanced features offered by the private network neutral host 502. There are additional enhanced features that provided by the presently disclosed methods and apparatus for neutral host enhanced features.

Preferential Treatment of Enterprise Employees

As noted above, in some embodiments, preferential resource allocation can be provided to UEs subscribing to an enterprise network. In some such cases, a list of UE IMSIs associated with the enterprise are stored. When there is congestion in the network, the UEs that subscribe to the enterprise network are provided preferential access. In some embodiments, the enterprise subscribed UEs are defined as belonging to a user group that is allowed priority over the other users of the network. As noted above, when network resources are limited, preemption of the non-enterprise employee UEs/flows is performed to provide access to employee and Enterprise Network authorized UEs. There are several solutions provided by the presently disclosed methods and apparatus for Neutral Host Enhanced Features and they are now described hereinbelow.

Preferential Resource Allocation to Employee Devices

A list of device identifiers (e.g., IMSIs) associated with the enterprise is stored. When there is congestion in the network, the UEs that belong to the enterprise employees are provided preferential access. In some embodiments, the employee devices are defined to belong to a user group that is allowed priority over other users of the network. When resources are limited, preemption of the non-enterprise-employees UEs/flows are done to provide access to UEs of the enterprise employees. In some embodiments the restriction/access decisions are made by the MME based on certain pre-defined preferential treatment conditions.

Solution 1: This solution provides access to the neutral host private network only for the enterprise employee devices that are provisioned with geofence information, so that only those devices look for the enterprise neutral host. This solution applies to any and all neutral host architectures.

Solution 2: RFSP (RAT/Frequency selection priority) can be provided on a UE basis. This needs to be performed by the MNO network in a selective way. If the enterprise network can negotiate with the MNO for the appropriate RFSP provisioning for the employee devices, it will enable only the employee devices to look for their associated enterprise campus information. This solution applies to any and all neutral host architectures. This solution focuses on macro messages transmitted on the macro network. It is used for the UE to start scanning for intra-frequency while remaining on the same channel. It is guarded below a certain threshold for the serving cell. It informs the selected UE where to look for the neutral host in the inter-frequency.

Solution 3: An MNO can reject camping based on authorization procedures and the UE will block the enterprise network (TAC) for a finite period of time (e.g., for 30 mins to 60 minutes). This solution can be utilized when a MOCN architecture is used. More specifically, the MOCN gateway, such as the MOCN gateway 518 of FIG. 5, is modified to achieve this functionality. The given UE that is blocked will not re-try to camp on the EN for the selected period of time.

Figure 6:
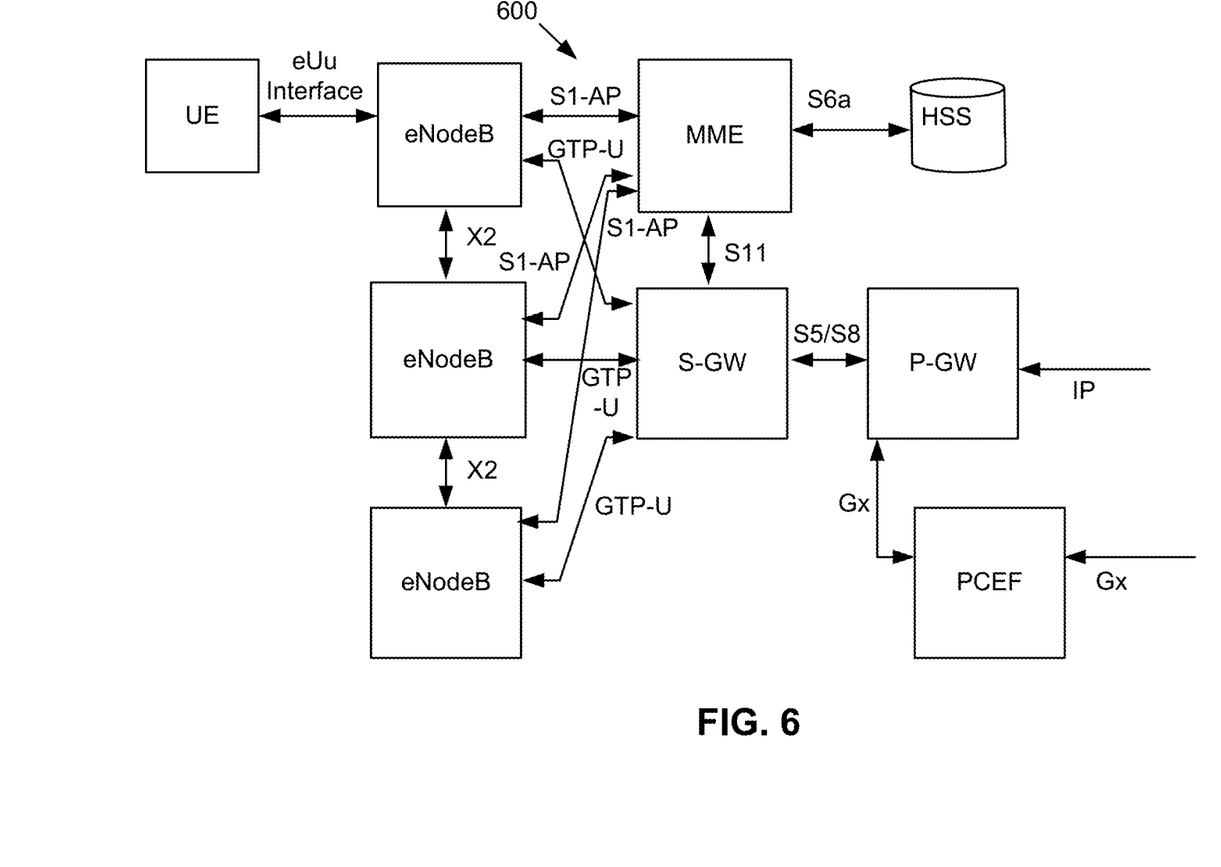
FIG. 6 shows an S6a/S8 interface used in the architecture partially shown in the figure.

Solution 4: If an S6a/S8 approach is used, as shown in the architecture 600 partially shown in FIG. 6, the IMSIs of specific and well-known employees of a corporate entity (such as Ford, Apple, etc.) can be stored, and the MME on the enterprise campus can reject or redirect the UEs based upon their IMSIs. All of the blocks to the left of the S6a and S5/S8 interfaces shown in the architecture 600 are within the private EN network. All the functional blocks to the right of the S6a and S5/S8 interfaces shown in the architecture 600 are within the MNO core network.

Solution 5: Use of independent Access Classes for devices that support neutral host camping. Devices are provisioned with the associated Access Class and network broadcasts the restrictions on Access Class for camping. UEs select/avoid the neutral host network based on the Access Class it is provisioned to use.

Allowing or Disallowing Access to Multimedia Broadcast Multicast Service (eMBMS) Broadcasts One of the features that are addressed by the presently disclosed methods and apparatus is used when Receiving eMBMS broadcasts. The UEs, such as the UE 302 of FIG. 5, operating on the EN private network 502 without explicit support from the neutral host 502, will not be able to receive broadcast content. Therefore, the UE 302 must receive explicit support from the neutral host 502 to be able to receive eMBMS broadcasts. This issues raises the question of whether a guest user may still need to use the MNO even though they are in the same building as the neutral host private network. One possibility is to allow the guest user to use the private neutral host network to access the MNO.

There are several solutions to the issues and enhanced features set forth above that are addressed and provided by the presently disclosed methods and apparatus for Neutral Host Enhanced Features. These enhanced features are now described and set forth hereinbelow.

Option 1:

In some embodiments, a UE that subscribes to the enterprise network and is operating on the enterprise network and will receive broadcasts directly on a broadcast channel. The enterprise eNBs/gNBs (BS/APs) announce service availability for an evolved Multimedia Broadcast Multicast Service (eMBMS). The service availability needs to be received from the MNO core. This will be an explicit message exchange that is received from a Broadcast Multicast Service Center (BM-SC) (see, e.g., FIG. 7) routed through a secure Internet Protocol tunnel (i.e., IPSec tunnel) to the enterprise network for populating the system information block (SIB) broadcasts. In some embodiments, the MNO network transmits the eMBMS traffic only when there are users to receive the traffic. The UE registers with the BM-SC (see, e.g., FIG. 7) and provides information to the enterprise network regarding where the UE wants to receive the eMBMS traffic. The eMBMS traffic that is encrypted based on the individual streams from the BM-SC is transmitted to the enterprise network for it to be broadcast over the enterprise BS/APs.

The UEs register to receive specific broadcast streams. This is accomplished using the BM-SC. The eMBMS traffic is sent to the enterprise network from which the broadcast is transmitted.

Option 2:

The UE operating on the enterprise neutral host network needs to be informed of the eMBMS broadcasts scheduled in the MNO network along the with the cell/frequency information where the UE can transition to receive the eMBMS broadcasts. The neutral host network acquires the Macro Network information of where the eMBMS broadcast is occurring. The neutral host then broadcasts that information so that a UE that is desirous of receiving multicast channel transitions can do so and in a manner that allows it to receive the multicast channel.

Sub-Option A:

In some embodiments, when the UE is in the footprint of the MNO network, the UE transitions to the MNO network to receive the eMBMS broadcast. The UE registers with the BM-SC (see, e.g., the BM-SC shown in FIG. 7) to receive the broadcast from the MNO network.

Sub-Option B:

In some embodiments, the UE recognizes the eMBMS traffic. The UE can then decide to receive the information as unicast traffic on the enterprise network. In some embodiments, the UE selects this option when the MNO network footprint is not available. In some embodiments, the UE selects this option even when the MNO footprint is available. In some embodiments, the UE also accesses other enterprise services.

Receiving eMBMS Broadcasts

Figure 7:
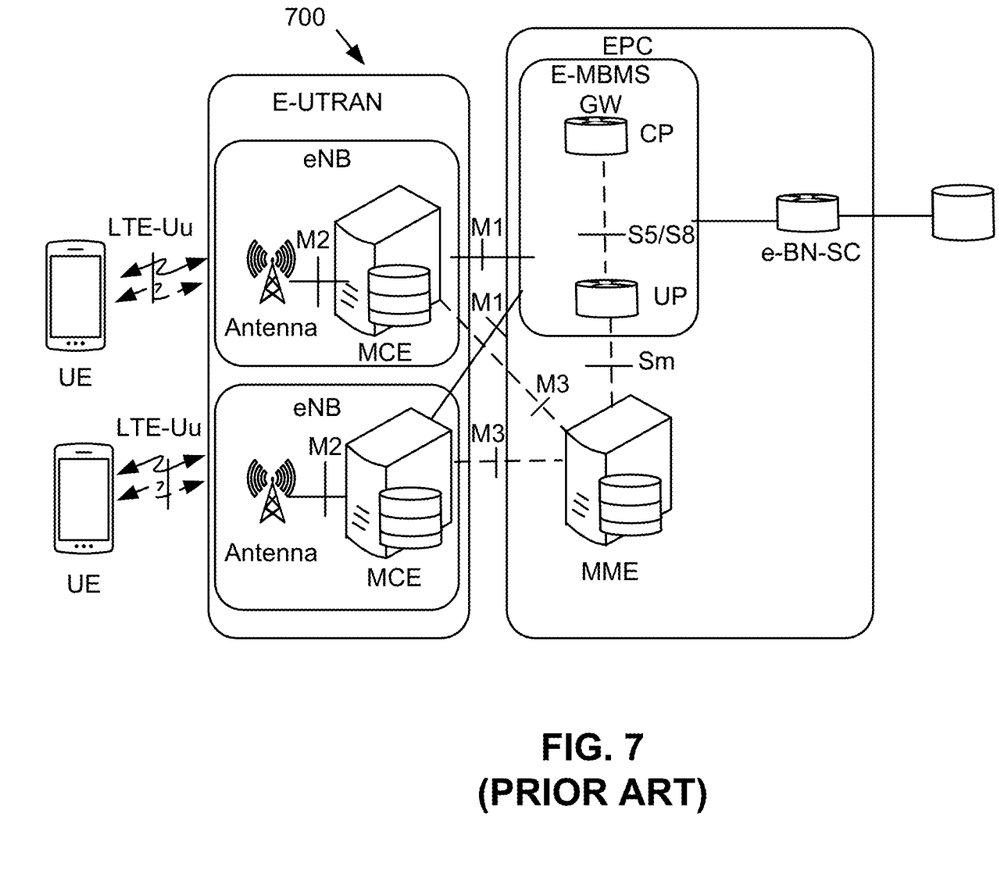
FIG. 7 shows a prior art LTE eMBMS architecture showing a Broadcast Multicast Service Center.

FIG. 7 shows a prior art LTE eMBMS architecture showing a Broadcast Multicast Service Center. The UEs use a unique multicast IP address that is not connected to the network but is still receiving IP traffic in a broadcast channel. The UE still needs an IP address but the IP address happens to be a multicast IP address. The eNBs typically will only transfer the broadcast information to UEs that have specifically subscribed to the multicast IP address. Hence, the broadcast is delivered based on that multicast IP address and this broadcast is received as encrypted data, and the keys to decrypt the broadcast data are provided ahead of time. This is well-known prior art technology.

The difficulty occurs when the UE connects to an eNB/gNB within the private network such as the private network 502 of FIG. 5. One of the macro frequencies are transmitting the Broadcast Multicast (such as an NFL game) on a certainly frequency, but the private network eNBs/gNBs are unaware of this. The Broadcast multicast data may be being transmitted on a Macro frequency and the eNB/gNBs of the private network 502 have no knowledge of this. There are several possible embodiments of the presently disclosed Neutral Host Enhancement Features that address this eMBMS broadcast problem.

Procedures with the Current Realization from MNO Core Network

The LBS procedures are run from the MNO core using UE based, UE assisted, network assisted, network-based procedures. These can be RAT independent or RAT dependent. These procedures can be run over control plane or user plane.

This procedure assumes knowledge of the geographic locations where the Cell-IDs are deployed.

Implications for Neutral Host

The TAIs and eNB-IDs are specific to Private/Non-Public campus deployments and typically involves a translation of these identifiers for establishing connectivity to the MNO core and exchange signal and user plane traffic. The translation is specific to each MNO.

Current procedures involve the MNO core determining the TAIs and Cell-IDs based on the required notification area to deliver the WEA/PWS messages and location algorithms based on measurement reports of Cell-IDs. This approach will no longer work given the aggregation of the campus sites involved with the MOCN GW.

The below issues need to be addressed:

UE includes the 'Last Visited Registered TAI' in the Attach Request message. The UE, when it has previously attached to a Private CBRS/Non-Public network, provides the Private CBRS/Non-Public network TAI.

The MNO MME in the Attach Accept message may provide a TAI List providing the tracking areas where the UE can transition without sending a TAU Update. The TAI List needs to match the TAIs deployed by the Private CBRS/Non-Public network.

For LBS, the procedures require knowledge of the deployed eNB-ID identifiers at that MNO core to request the UE/Private/Non-Public network to perform measurements reporting in order to enable horizontal and vertical positioning.

The presently disclosed methods and apparatus for Neutral Host Enhanced Features provides solutions to these issues and problems. These are now disclosed hereinbelow.

Solution 1: The MNOs all align to use the same TAC-ID ("Tracking Area Code—ID") and Cell-ID for each neutral host deployment.

TAC-ID

The recommendation for the TAC can be to specify the "high byte" to use a specific value with the freedom for the individual neutral host deployments to use any of the 256 "low bytes". For LTE and the currently available devices in the market for 5G NR, do not support independent TACs per PLMN in the SIB broadcasts. A single value is used for all devices camping on a neutral host cell. The support for the "per-PLMN TAC support" feature can be introduced in the 5G NR neutral host networks but will require backward compatibility until the legacy devices are no longer in use. Once per-PLMN TAC-ID can be supported, this aspect becomes a non-issue.

Cell-ID

The Cell-IDs need to be uniquely assigned and when interpretable in the individual MNO cores and enterprise networks. It will need to be determined whether the Cell-ID needs to be globally unique, or can be interpreted together with the PLMN-ID and TAC-IDs. The measurement reports must be processed in the MNO core for location determination.

Solution 2—

Each MNO obtains an PLMN-ID for enterprise neutral host operation. The enterprise network supporting neutral host is deployed with the TAC and Cell-ID associated with the SHNI. This information is provided to the MNOs. The expectation is that these TACs and Cell-IDs are unique within each of the MNOs PLMNs used by the UE to camp on the neutral host network.

This MNO identified PLMN for neutral host is populated in the SIM credential PLMN list for the UE to camp on the enterprise network. The relative prioritization of this MNO identified PLMN for neutral host camping can be specified in the PLMN list. Additionally, radio procedures for transitioning from the macro network to the enterprise network can be coordinated based on SIB broadcasts from the macro network. Every MNO that has access to a private network has access to the private network via a PLMN. If there are three MNOs accessing a private network, there are three unique PLMNs used to access the private network.

Current TAC and Cell-ID Assignment Procedures from CBRS

There are 6 TAC per IBN purchased assigned. There are 10K IBNs, resulting in 60K TACs that can be associated with the IBN purchases. TAC is a 16-bit identifier. 2^16-60K=5536 can be "locally" allocated and independently purchased from OnGoA. The Cell-ID are individual purchased and associated with the SHNI to form the ECGI.

Solution 3 (Described in Detail in a Related Patent Application)

The TAI and Cell-ID mapping across the Private CBRS/Non-Public network and the individual MNO network assigned identifiers are shared between the two entities. The Private CBRS/Non-Public network cell broadcasts are based on the Private CBRS/Non-Public network TAI and Cell identifiers. The MNO PLMNs are also broadcasted on the neutral host cells. The signaling messages exchanged between the UE Private CBRS/Non-Public network are based on the TAI and Cell identifiers of Private CBRS/Non-Public network. These signaling messages are transitioned to MNO specific TAI and Cell identifiers.

MNO MME Implications

The MNO MME maintains a mapping between the Private CBRS/Non-Public network TAIs with the corresponding one identified in the MNO network. A selected MNO network may be connected to multiple Private CBRS/Non-Public networks and will need to maintain the mappings based on the S1 connectivity established with the MOCN GWs.

Last Visited Registered TAIs

The UE includes the 'Last Visited Registered TAI' in the Attach Request message. The UE when it previously Attached to a Private CBRS/Non-Public network, it will provide the Private CBRS/Non-Public network TAI.

MNO MME can either interact with the Private CBRS/Non-Public network to retrieve the prior context of the UE or ignore that and proceed to reestablish the full UE context again. When active sessions need to be transitioned from Private CBRS/Non-Public network to the MNO network, retrieving the prior established information will be required for real-time services like VoLTE.

Handling TAI List when the UE Operates in Private CBRS/Non-Public Networks

The MNO MME in the Attach Accept message may provide a TAI List providing the tracking areas where the UE can transition without sending a TAU Update. The TAI List needs to match the TAIs deployed by the Private CBRS/Non-Public network.

The MNO MME when operating in the Private CBRS/Non-Public network, needs to provide the TAI list used by the Private CBRS/Non-Public network if it wants to manage the UE transitions across TAIs within the Private CBRS/Non-Public network.

One option for the MNO MME is to not provide a TAI List. Given that the Private CBRS/Non-Public network of each specific deployment footprint will be fairly small, not including the TAI List will be the common practice and will also limit the 'Paging' area for the UE.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

SUMMARY

Methods and apparatus for Neutral Host Enhanced Features are described. One of the features that are addressed by the presently disclosed methods and apparatus is used when receiving eMBMS broadcasts. The UEs operating on the EN private network without explicit support from the neutral host will not be able to receive the eMBMS broadcast content. Therefore, the UE must receive explicit support from the neutral host to be able to receive eMBMS broadcasts. Another enhanced feature provided to the Neutral Host and enabled by the presently disclosed methods and apparatus regards the Preferential Treatment of Enterprise Network Employees.

As noted above, in some embodiments, preferential resource allocation can be provided to UEs subscribing to an enterprise network. In some such cases, a list of UE IMSIs associated with the enterprise are stored. When there is congestion in the network, the UEs that subscribe to the enterprise network are provided preferential access. In some embodiments, the enterprise subscribed UEs are defined as belonging to a user group that is allowed priority over the other users of the network. As noted above, when network resources are limited, preemption of the non-enterprise employee UEs/flows is performed to provide access to employee and Enterprise Network authorized UEs. There are several solutions provided by the presently disclosed methods and apparatus for Neutral Host Enhanced Features.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A neutral host Enterprise Network (EN), wherein the neutral host EN comprises a Private CBRS/Non-public Network, and wherein the neutral host EN is in wireless communication with an MNO Network Core, comprising:
   a) a plurality of neutral host EN eNBs/gNBs in wireless communication with a plurality of UEs, wherein the neutral host EN eNBs/gNBs broadcast a PLMN, TAC (Tracking Area Code) and Cell IDs of the neutral host EN;
   b) a Private EN Core, in wireless communication with the MNO Network Core, wherein the MNO Network Core comprises an MME functional block and an LBS functional block, and wherein the MNO network core uniquely determines the Cell ID and location of each of the neutral host eNBs/gNBs, and wherein the Cell ID and location of each of the neutral host EN eNBs/gNBs are assigned unique numbers that are identifiable to the Private EN Core; and
   wherein access by a selected UE to the neutral host EN is determined by a plurality of factors, wherein one of the factors is whether the selected UE subscribes to the neutral host EN in which case the selected UE is blocked from accessing the neutral host EN if it is not subscribed to the neutral host EN.

2. The neutral host Enterprise Network of claim 1, wherein the neutral host EN provides preferential treatment of UEs that subscribe to the neutral host EN, and wherein when there is congestion in the neutral host EN the UEs that subscribe to the neutral host EN are provided preferential treatment as compared to the UEs that do not subscribe to the neutral host EN.

3. The neutral host EN of claim 2, wherein when the neutral host EN resources are limited, and wherein preemption of non-enterprise employee UEs/flows is performed to provide access to employees and their Network-authorized UEs.

4. The neutral host EN of claim 2, wherein access to the neutral host EN is given to only enterprise employee devices that are provisioned with geofence information.

5. The neutral host EN f claim 2, wherein access to the neutral host EN is given using RFSP (RAT/Frequency selection priority) methods provided on a UE basis.

6. The neutral host EN of claim 5, where the RFSP methods are performed by an MNO network in a selective way, wherein if the neutral host EN can negotiate with an MNO for an appropriate RFSP provisioning for the employee devices, it enables only employee devices to look for their associated enterprise campus information.

7. The neutral host EN of claim 6, wherein focus is placed on macro messages transmitted on a macro network, and wherein the selected UE starts scanning for intra-frequency without changing channels, and wherein the selected UE is guarded below a certain threshold for a serving cell; and wherein the selected UE looks for the neutral host EN in an inter-frequency.

8. The neutral host EN of claim 2, wherein an MNO rejects camping of the selected UE based on authorization procedures, and wherein the selected UE is blocked for a finite time period by the TAC broadcast by the neutral host EN, and wherein the selected UE that is blocked will not attempt to re-try camping on the neutral host EN for the finite time period.

9. The neutral host EN of claim 2, wherein a list of International Mobile Subscriber Identifiers (IMSIs) of members of a neutral host EN is maintained and stored, and a Mobility Management Entity (MME) on an enterprise campus can reject or redirect UEs based upon their IMSIs.

10. The neutral host EN of claim 2, wherein devices are provisioned with an associated Access Class and wherein the neutral host EN broadcasts restrictions on Access Class for camping of the devices; and wherein the UEs select or avoid the neutral host network based on the Access Class it is provisioned to use.

* * * * *